Oct. 25, 1932.    G. W. SMITH    1,884,896
FLUID ANALYSIS
Filed July 29, 1927    4 Sheets-Sheet 1

Fig. 1

INVENTOR
George W. Smith
by his attorneys
Byrnes, Stebbins & Parmelee

Oct. 25, 1932.   G. W. SMITH   1,884,896
FLUID ANALYSIS
Filed July 29, 1927   4 Sheets-Sheet 3

INVENTOR

Oct. 25, 1932.　　　G. W. SMITH　　　1,884,896
FLUID ANALYSIS
Filed July 29, 1927　　4 Sheets-Sheet 4

INVENTOR

Patented Oct. 25, 1932

1,884,896

UNITED STATES PATENT OFFICE

GEORGE W. SMITH, OF PITTSBURGH, PENNSYLVANIA, ASSIGNOR TO JOHN M. HOPWOOD, OF PITTSBURGH, PENNSYLVANIA

FLUID ANALYSIS

Application filed July 29, 1927. Serial No. 209,289.

The present invention relates to fluid analysis, and more especially to the quantitative determination of the composition of mixed fluids by a comparison of their lamellar and turbulent flow. It is particularly applicable to the determination of the relative volumes in which gases are present in a gaseous mixture, as for example, the determination of the carbon dioxide content in the gaseous products of combustion. The percentage of carbon dioxide in the flue gases may be automatically measured and used as a basis of furnace control so as to maintain the proper ratio of fuel and air for the best combustion.

In making such determinations, the relative difference in resistance of fluids to lamellar and turbulent flow is utilized. When a fluid is passed through a restricted passage of small cross-section relative to its length, such as a capillary tube, a porous plate or a bed of granular material, at not too great a pressure, the flow takes place along relatively smooth flow lines and without eddies and is of the so-called lamellar or capillary type of flow. The pressure drop across the passage is approximately proportional to the volume of the fluid passed (rate of flow) and to its viscosity. The pressure drop is practically independent of the density of the fluid. On the other hand, when a fluid is passed through a restricted opening of a diameter relatively large, as compared with its length, such as an orifice in a thin plate, or even through a tube under sufficiently high pressure, the flow is broken up into eddies and is said to be of the turbulent type of flow. The pressure drop across the orifice or passage in which the turbulent flow takes place is approximately proportional to the square of the volume of the fluid passed (the square of the rate of flow) and to its density. The pressure drop is practically independent of the viscosity of the fluid.

These two types of flow are characteristic of fluids, in general, including both gaseous and liquid fluids.

The relative resistance to lamellar flow and to turbulent flow is therefore dependent upon the rate of flow, the density and the viscosity of the fluid.

In the case of a mixed fluid, the density and viscosity are dependent upon the relative proportions of the fluids making up the mixture. Knowing the relative resistance to lamellar and turbulent flow of two fluids, measurements of the resistance offered by the lamellar and turbulent flow of a mixture containing them, furnish a means for determining their relative proportions in the mixture. For example, if a restricted passageway in which lamellar flow prevails, such as a capillary tube, and a passageway in which turbulent flow prevails, such as a thin plate orifice, be placed in series and the fluid passed through both, the temperature being maintained uniform, the relative pressure drops across the capillary tube and the orifice furnishes a means for determining the density and viscosity of the fluid. If the relative pressure drops be determined, first, for one fluid passed through the device, and then for another fluid passed through it, the relative pressure drops furnish a means for determining the relative proportions in a mixture of the two fluids when passed through the device.

I will now consider in somewhat greater detail the conditions of lamellar and turbulent flow and how the determination of these two types of flow affords a means for the quantitative determination of the percentages of the constituent fluids in a mixture.

If a fluid be passed through a tube under sufficiently small pressure, the flow will in all cases be lamellar and the volume of fluid per unit of time (rate of flow) will increase in approximate proportion to the pressure gradient along the tube. As the pressure gradient is increased and the rate of flow increases in consequence, a pressure will be reached at which the rate of flow is no longer proportional to the pressure. This pressure is called the transition pressure or critical pressure. The pressure-flow relationship at this point is not definite as the flow at portions of the tube may be lamellar flow, while at other portions it may be turbulent flow. As the pressure is increased beyond the transition range, or critical pressure, the flow throughout the tube becomes turbulent in character, and with further increases in pressure, the rate of flow increases as the square root of the pressure gradient. By operating with suitable flow restrictions and suitable pressure gradients, the flow can be made definitely lamellar or turbulent. In a restriction where lamellar flow prevails under a constant pressure difference across the restriction, the rate of flow will be inversely proportional to the viscosity of the fluid flowing. The higher the viscosity of the fluid, the less fluid will pass, per unit of time, under the same pressure difference. If turbulent flow prevails in a restriction under a constant pressure difference over the restriction, the rate of flow of the fluid will be inversely proportional to the density of the fluid, that is to say, a fluid having a higher density will flow more slowly through the restriction than a fluid having a lower density, under the same pressure difference.

Under conditions of lamellar flow the density of the fluid passed is of little or no influence; under turbulent flow, the viscosity of the fluid passed is of little or no influence. Accordingly, if a passageway in which lamellar flow prevails, such as a capillary tube, and one in which turbulent flow prevails, such as an orifice, be placed in series, and a fluid passed through them in series, a flow will be established which will depend upon the dimensions of the passageways, upon the difference between the initial or entering and the final or discharge pressures, and upon the density and viscosity of the fluid which passes. The total pressure drop between the initial and final pressures may be divided into two pressure drops (1) across the capillary tube and (2) across the orifice which, when added together, gives the total pressure drop. The pressure drop across the capillary tube and the pressure drop across the orifice will, of course, depend upon the dimensions, the rate of flow, and the density and viscosity of the fluid. The pressure drop across the capillary restriction will be proportional to the rate of flow established and the viscosity of the fluid. The pressure drop across the orifice restriction will be proportional to the square of the rate of flow established and to the density of the fluid. If then the initial and final pressures be maintained constant and if the density and the viscosity of the fluid do not vary, the intermediate pressure, that is, the pressure at the point between the capillary tube and the orifice, will remain constant.

If the initial and final pressures be maintained constant, but the viscosity or the density of the fluid or both vary, then the rate of flow and the intermediate pressure will vary.

If the density of the fluid passing remains constant and the viscosity decreases, then under the same pressure drop across the capillary tube, more fluid can pass. Since, however, the density of the fluid has not changed, a higher pressure drop will be required across the orifice to pass this greater quantity of fluid. The pressure at the point intermediate the capillary tube and the orifice will therefore rise until a new rate of flow and a new intermediate pressure is established corresponding to the viscosity and density of the fluid. Under these new conditions, a lesser proportion of the total pressure drop will exist across the capillary and a greater proportion of the total pressure drop will exist across the orifice.

If the viscosity of the fluid passing increases, then under the same pressure drop across the lamellar flow capillary restriction, less fluid can pass per unit of time, and the rate of flow is decreased. The density remaining the same, a lesser pressure drop will be required across the turbulent flow orifice to pass this lesser rate of flow. Accordingly, the pressure intermediate the capillary tube and orifice will tend to decrease until the proportionate pressure drops across the two restrictions correspond to the altered viscosity.

If the viscosity remains the same and the density increases, then a greater pressure drop will be required to pass the same volume of fluid in a unit of time across the turbulent flow orifice restriction, or under the same pressure drop, a lesser rate of flow will be established. Since the viscosity has not altered, this lessened rate of flow through the capillary restriction will require a lesser pressure drop, and the pressure drop at the point intermediate the capillary and orifice will tend to increase. In a similar manner, if the viscosity remains the same and the density decreases, the intermediate pressure will tend to decrease.

The effect of varying viscosities and densities can occur separately or concurrently. If, for example, under a given initial and final pressure across a capillary tube and a thin plate orifice in series, the viscosity of the fluid increases, while the density decreases, the intermediate pressure will tend to fall by reason both of the increased viscosity and decreased density. Conversely, if the viscosity decreases and the density increases, the intermediate pressure will rise.

Since the viscosity and density of fluids are, in general, independent properties, fluids and fluid mixtures can be found in which increased density is accompanied by decreased viscosity, increased density by increased viscosity, decreased density by increased viscosity, and decreased density by decreased viscosity. It will be apparent that if a capillary tube and an orifice be placed in series and maintained under a constant initial and a constant final pressure, and if both the viscosity and the density of the fluid increases, then the pressure intermediate the restrictions will tend to rise because of the increased density but will tend to fall because of the increased viscosity The intermediate pressure, therefore, will rise or fall, depending upon whether the change in viscosity or change in density has the preponderating effect.

Since under definite conditions, the viscosity and density of the fluid are characteristic properties of the fluid, if two fluids having different viscosities and/or different densities be passed through the same lamellar and turbulent flow restrictions in series, the intermediate pressure will, in general, be different for each of the two fluids. Mixtures of two such fluids having intermediate viscosities and intermediate densities will, when passed through this arrangement, give pressures at the point intermediate the two restrictions which will depend upon the relative proportions of each of the two fluids in the mixture. Therefore, if the same pressure drop be maintained across the lamellar and turbulent flow restrictions in series, the variations in the intermediate pressures occurring with different fluids or mixtures of fluids may be utilized in determining their densities and viscosities, or the percentage of a fluid in a mixture.

Such variations in the intermediate pressures may be observed by suitably calibrated pressure devices or they may be utilized by means of suitable pressure-responsive devices for automatic control. For example, the gaseous products of combustion may be passed at a constant pressure through an arrangement of a lamellar flow restriction and a turbulent flow restriction in series, and the variation in the intermediate pressure be used to measure the percentage of carbon dioxide; or by suitable automatic pressure-responsive mechanism, the variations in intermediate pressure may be utilized to automatically control the conditions of combustion so as to maintain the desired percentage of carbon dioxide in the flue gases and therefore the best conditions for the combustion of the fuel.

The invention will be specifically illustrated and described with reference to its embodiment in an automatic control of furnace combustion in accordance with the composition of the flue gases, but it will be understood that the invention is not limited to such embodiment, but is capable of general application to the analysis of fluids, both gaseous and liquid.

In the accompanying drawings,—

Figure 1:
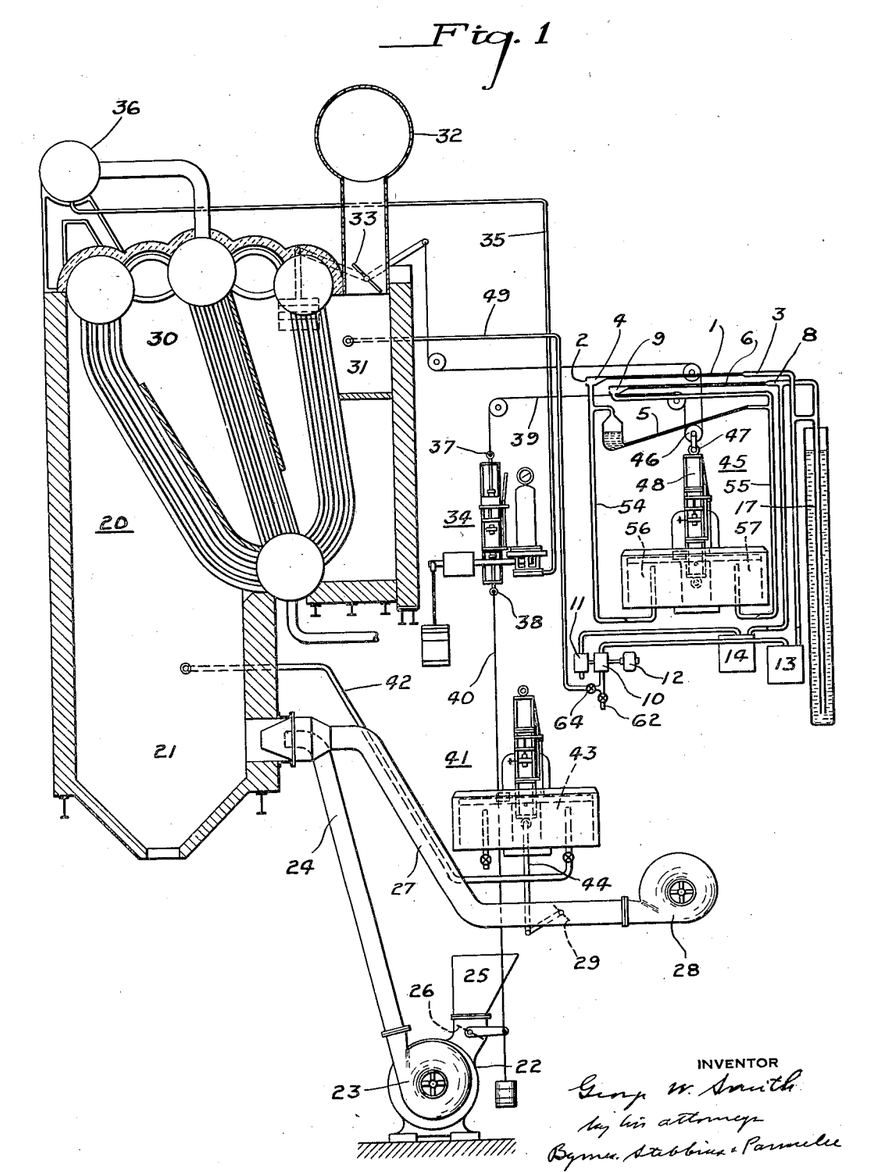
Figure 1 is a diagrammatic view of a system of furnace combustion control embodying my invention.

Before describing the combustion controlling system as shown in Figure 1 in detail, I will first briefly describe the lamellar or capillary flow and the turbulent flow restrictions and their action upon a stream of gas passed through them.

Figure 3:
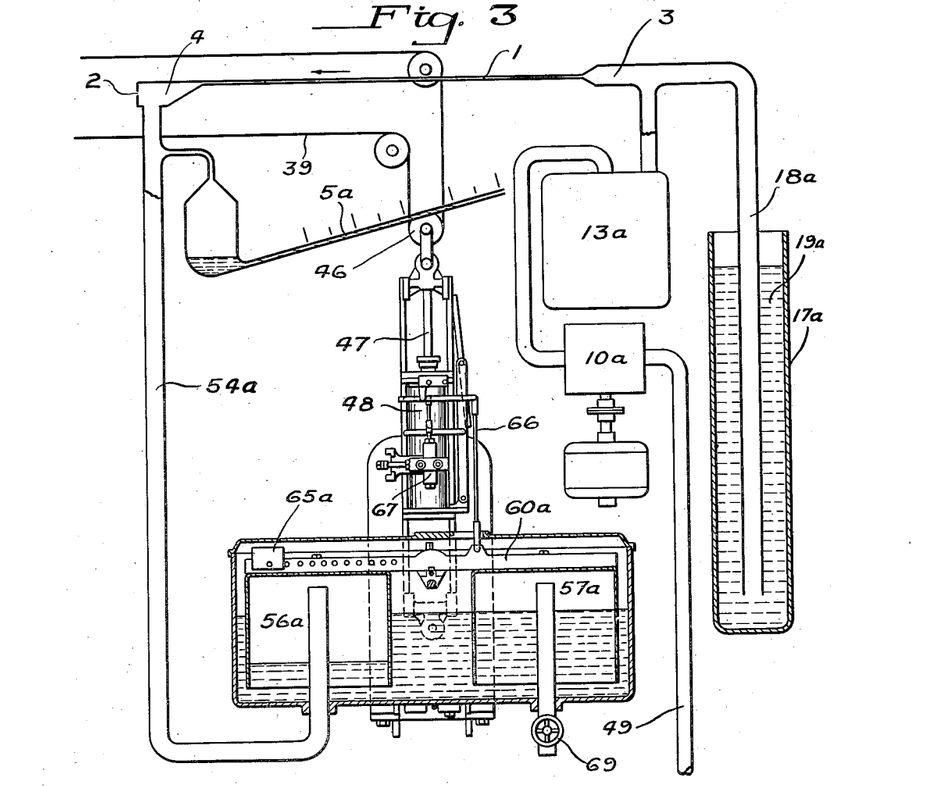
Figure 3 is a view similar to Figure 2 but showing a modification.

Referring first to Figure 3 which shows the simpler form of flow device, reference numeral 1 indicates a capillary tube and reference numeral 2 indicates an orifice. The fluid, usually a gas, flows through the capillary tube 1 and the orifice 2 in series in the direction indicated by the arrow in Figure 3. The gas is supplied at a constant super-atmospheric initial pressure maintained in the supply tube 3. The gas is discharged into the atmosphere from the orifice 2 so that the final pressure is atmospheric. There is a chamber 4 intermediate the capillary tube 1 and the orifice 2. A pressure gauge $5^a$ is connected to indicate the pressure in the chamber 4. This pressure is that which I have above referred to as the intermediate pressure, being the pressure at the point intermediate the capillary or lamellar restriction 1 and the turbulent or orifice restriction 2.

If a gas, say, for example, air, is supplied at the inlet tube 3 at a constant pressure, a flow is established through the device and an intermediate pressure is established in the chamber 4 which can be measured by the pressure gauge $5^a$. If a gas having a different density and/or viscosity is supplied at the same constant pressure in the inlet tube 3, a different condition of flow is maintained, together with a different intermediate pressure at point 4, or if a mixture of gases having different densities and/or viscosities is passed through the device, a change in the relative proportions of the gases in the mixture will cause the flow to be changed and the intermediate pressure at the point 4 to vary. As a specific example, assume that a flue gas, such as that resulting from the combustion of fuel in the furnace, is supplied to the inlet tube 3 under a constant pressure, and assume for the sake of simplicity that the humidity and temperature of the gas as supplied to the inlet tube 3 are also maintained constantly. Flue gases, in general, consist principally of nitrogen, carbon dioxide and oxygen, together with smaller amounts of carbon monoxide, hydrogen and sulphur dioxide, which are relatively small compared with the amount of carbon dioxide present. Of the gases generally present in significant amounts, oxygen and nitrogen have about the same viscosities and densities as air. The viscosity of air at 60° Fahrenheit is .000181 (in C. G. S.

units). Its density can be taken as 1. The viscosity of carbon dioxide at 60° Fahrenheit is .000146, and its density is 1.53. It will be seen that the density of carbon dioxide is over one and one-half times that of air, while its viscosity is but a little over three-fourths that of the viscosity of air.

If flue gas is passed through the capillary and turbulent flow restrictions 1 and 2 and the amount of carbon dioxide in the flue gas increases, the density of the flue gas will increase and its viscosity will be lowered. Consequently, the pressure drop over the capillary restriction 1 will tend to decrease and the pressure drop over the orifice 2 will tend to increase, so that the intermediate pressure at the point 4 will increase. Similarly, if the proportion of carbon dioxide in the flue gas decreases, the intermediate pressure at the point 4 will decrease. If the other conditions are maintained the same, the pressure variation at the point 4, which may be measured by a suitable calibrated pressure gauge, will give an indication of the percentage of carbon dioxide in the flue gas.

In order to get a better determination of the analysis of the gas by the pressure variations at the intermediate point 4, it is preferable to proportion the capillary and orifice restrictions so that the pressure drop over the capillary or lamellar flow restriction 1 is large in comparison with the pressure drop across the orifice or turbulent flow restriction 2. If this be done, the flow of the gases through the device will be controlled primarily by the capillary tube 1, which we may term, for convenience, the dispensing restriction, so that the variations in the intermediate pressure at the point 4 will have a relatively small effect upon the volume of gases flowing through the device. The pressure which is measured at the point 4 is the pressure over the turbulent flow orifice 2, and the orifice 2 may, for convenience, be designated as the measuring restriction. For example, if the pressure in the inlet tube 3 be maintained at about eighty inches of water super-atmospheric pressure, the pressure drop across the capillary tube 1 may be seventy-seven inches of water, and the pressure drop across the orifice 2 may be three inches of water.

Assume that the flue gas is supplied to the inlet tube 3 at a pressure maintained constant at eighty inches of water above the atmospheric or final pressure into which the gas is discharged from the orifice 2. If the carbon dioxide in the flue gas increases, the viscosity of the gas is lowered and a greater volume of gas will tend to flow through the capillary tube 1. Since the density of the flue gas is increased by the increased carbon dioxide, and since a greater volume tends to flow through the capillary tube 1 because of the decreased viscosity, there will be a greater pressure drop across the orifice 2. The increased pressure drop across the orifice 2 will in turn react upon the flow through the capillary tube 1 and will tend to slightly decrease the volume of the gas passing through it. However, by making the pressure drop across the orifice 2 small in proportion to the pressure drop across the capillary tube 1, the effect of this reacting pressure can be made relatively small. Therefore, the volume of the gas passing through the device at a constant initial pressure may be made to depend primarily upon its viscosity, and density changes will have a relatively small effect upon the volume of gas supplied by the dispensing restriction 1 to the measuring restriction 2.

In the case of flue gas containing carbon dioxide, an increase in the carbon dioxide content will, by lowering the viscosity, cause an increase in the flow of gas through the device, and the increase in flow, combined with the increase in density due to the increased carbon dioxide, will cause an increase in the pressure drop across the orifice 2 as measured by a pressure gauge from the intermediate point 4. As can be shown by calculation, a greater percentage change in the pressure at the point 4 for a given percentage change in the carbon dioxide of flue gas can be attained by making the drop over the capillary tube 1 large in comparsion with the drop over the orifice 2, than would be the case if the pressure drops over the capillary tube and orifice were approximately equal. Moreover, by making the principal part of the pressure drop occur over the dispensing restriction which supplies the gas to the measuring restriction, a smaller absolute pressure may be secured at the intermediate point 4 and one which is therefore easier to measure.

Variations in the temperature and humidity of the gas also affect the density and viscosity, and consequently affect the ratio of the pressure drops over the lamellar and turbulent flow restrictions for a constant initial pressure. Also, accidental variations in the initial pressure, such as might be caused by changes in the blowing device, will cause variations in the intermediate pressure at the point 4. Furthermore, the pressure at the point 4 is to be measured against some pressure as a standard, which is usually the atmospheric pressure or that upon the discharge side of the orifice 2. The pressure gauge, therefore, has to assume an initial pressure, say about three inches of water in the illustrated case referred to above, and the changes in pressure, due to the changes in the carbon dioxide content of the gases, will produce changes which are additive or subtractive from the three inch pressure but which are small in comparison therewith. For these reasons it is preferred to balance the pressure at the intermediate point 4 in the device for analyzing the mixture of gases, against an intermediate pressure in a similar device through which a gas of a fixed composition is supplied. By balancing the initial pressures, a more sensitive gauge may be used, since the pressure gauge will only have to measure the differential pressure. Also, by placing the two devices close to each other and humidifying the two gases at the same temperature, the effect of temperature changes and concomitant humidity changes will tend to neutralize themselves between the two devices, one supplied with the gaseous mixture to be analyzed, and the other with a gas of fixed composition. Such an arrangement is shown in Figure 2.

Figures 2, 4:
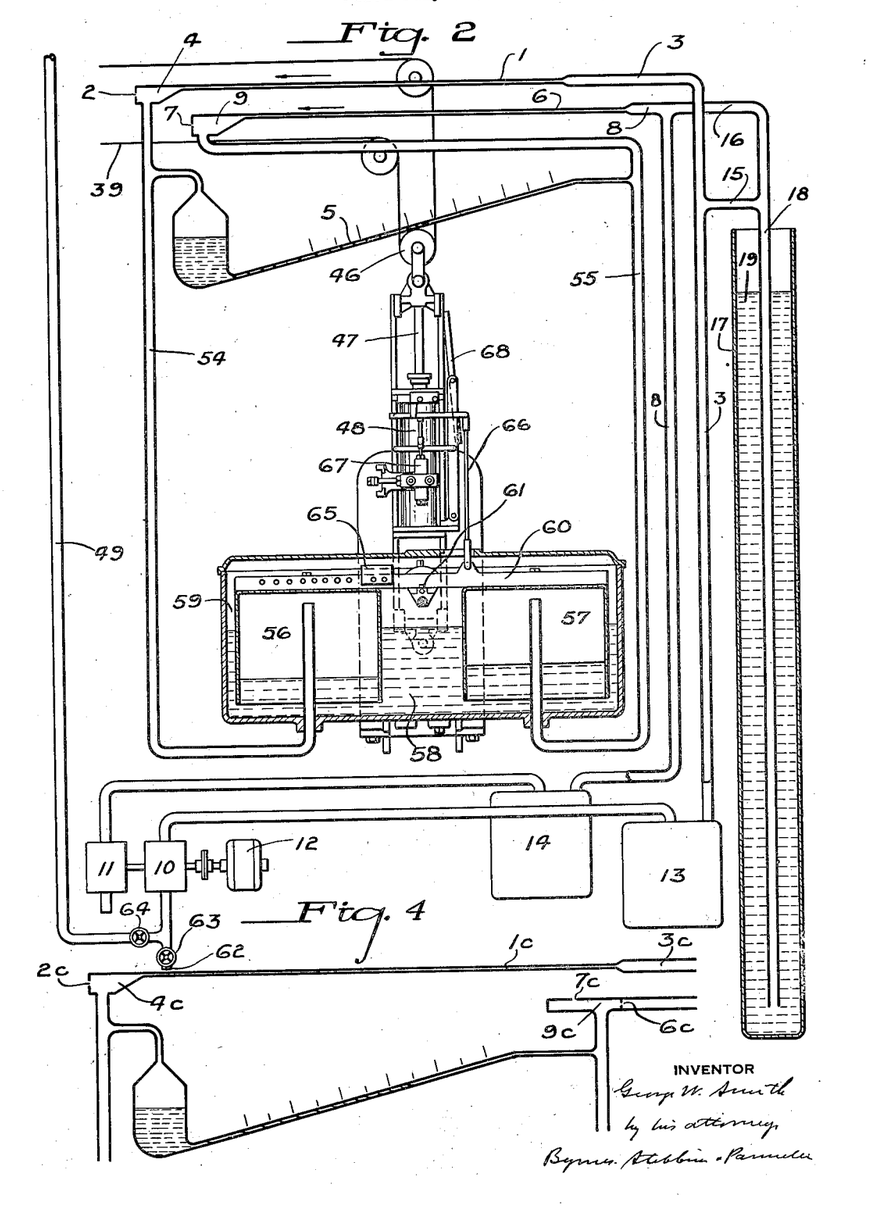
Figure 2 is an enlarged view of the flue gas analyzing device shown in Figure 1.
Figures 4, 5 and 6 are detail diagrammatic views showing modifications in the arrangement of the flow restrictions.

In Figure 2 reference numerals 1 and 2 indicate, respectively, a capillary tube and an orifice through which the gas to be analyzed, such as flue gas, is passed in the direction indicated by the arrow. A gas is supplied at a constant pressure through the inlet tube 3. A chamber 4 is situated between the capillary tube 1 and the orifice 2, and the chamber 4 is connected to one end of a pressure gauge 5.

Reference numerals 6 and 7 indicate, respectively, a capillary tube and an orifice similar to the capillary tube and orifice 1 and 2, and through which a gas, such as air, is passed. The air is supplied at a constant pressure by an inlet tube 8. A chamber 9 is situated intermediate the capillary tube 6 and the orifice 7 and is connected to the other end of the pressure gauge 5, so that the pressure gauge 5 indicates the differential pressure between the chambers 4 and 9.

The flue gas and air are supplied to the apparatus by blowers 10 and 11, respectively, driven by a common motor 12. The flue gas passes through a device 13 (hereinafter described in detail) in which the flue gas is bubbled through water to filter it, humidify it and bring it to the water temperature. The air is passed through a similar device 14 in which it is filtered, humidified and brought to the same temperature as the flue gas passing through the device 13. The air and gas are then passed to the respective capillary tubes 1 and 6 through the inlet tubes 3 and 8. A constant pressure device is connected by the branch pipes 15 and 16 to the inlet tubes 3 and 8, respectively, so that a constant pressure is maintained the same across the two sets of capillary and orifice restrictions 1 and 2 and 6 and 7. As shown in the drawing, the constant pressure device 17 consists of a tube 18 which dips into a bath of liquid, preferably mercury. The blowers 10 and 11 supply more gas than is passed through the capillary tubes 1 and 6, the excess gas passing out through the constant pressure device, which thereby serves to maintain a constant and equal pressure across each set of capillary and orifice restrictions.

The inlet tubes from the filtering, humidifying and constant temperature devices 13 and 14 preferably lie in proximity, and the two sets of capillary tubes and orifices 1 and 2 and 6 and 7 also lie in proximity, so that they are subject to the same temperature effects. The temperature effects can therefore be substantially eliminated if the water baths in the humidifying devices 13 and 14 are kept at the same temperature.

The dimensions of the restrictions 1 and 2 and 6 and 7 are preferably so proportioned that there is substantially the same pressure drop over the two capillary tubes 1 and 6 and over the two orifices 2 and 7. The absolute pressures in the chambers 4 and 9 above atmospheric pressure therefore tend to balance each other out, and the pressure gauge 5 can be made more sensitive, since it can serve as a differential gauge to measure the pressure differences between the chambers 4 and 9.

The composition of the air will, of course, remain substantially constant. If desired, air may be passed through the capillary tube 1 and orifice 2 from the blower 11 for calibration purposes and the pressures in the intermediate chambers 4 and 9 made equal for air passing through both sets of restrictions. Then, if flue gas be afterward passed through the capillary tube 1 while air is passed through the capillary tube 6, the differential pressure between the chambers 4 and 9 as indicated by the pressure gauge 5 will indicate the increase in pressure at the chamber 4 due to the carbon dioxide in the flue gas. Changes in the amounts of carbon dioxide in the flue gas will be reflected in changes in pressure in the chamber 4 and will be indicated by the differential pressure gauge 5 since, as above explained, the presence of carbon dioxide will increase the density and lower the viscosity of the flue gas.

Having thus described the general principles of the flue gas analysis by my device, I will next describe its application to the automatic control of furnace combustion so as to maintain the desired carbon dioxide content of the flue gases. As is well recognized in the furnace combustion art, the proportion of carbon dioxide in flue gas is an indication of the conditions of combustion. Too little carbon dioxide indicates too much excess air, and too much carbon dioxide indicates insufficient air for the best combustion. The optimum carbon dioxide content of the flue gas depends upon the particular type of furnace and fuel and may vary from about 11 to 17% in stoker and powdered coal fired furnaces. For most efficient conditions of combustion in any particular furnace, the carbon dioxide content should be maintained at the percentage determined by experience to be best for that particular type of furnace and fuel. The coal is burned in the usual combustion chamber 21. The powdered coal is supplied by a powdered coal machine 22 in which the coal is pulverized and is blown in a powdered condition by the blower 23 through the supply pipe 24 into the combustion chamber. The carrying air is commonly known in the powdered coal art as primary air. The coal is supplied to the powdered coal machine from a hopper 25. A valve 26 regulates the coal supply of the powdered coal machine. The secondary air for combustion of the coal is supplied through the air duct 27 by a forced draft blower 28. The air supply is controlled by a damper 29 in the air duct 27.

The hot gases of combustion from the combustion chamber 21 go through the passes of the boiler 30 and through the boiler breeching 31 to the stack 32. The outlet of the gases is controlled by the stack damper 33.

The combustion in the furnace may be primarily controlled by any of the well-known methods of combustion control. As shown in the drawing, the combustion is primarily controlled by a master regulator 34 which is operated in accordance with the steam pressure which is supplied to the master regulator through a pipe 35 tapped from the steam header 36. Any of the well-known forms of steam regulator may be used. The form illustrated is the well-known "Hagan" regulator of the general type shown in the Hopwood Patents Nos. 1,338,924 and 1,371,243, and the Peebles Patents Nos. 1,339,000 and 1,492,604. The details of construction and operation of the master regulator are old in the art and do not need to be described in detail. The master regulator is of the compensated type which operates by an incremental movement so that it assumes intermediate positions for steam pressures intermediate the maximum and minimum for which it is set. The master regulator has a power cylinder with a piston having upwardly and downwardly extending rods 37 and 38 to which are secured the ends of chains or cords 39 and 40 respectively. The cord 39 is connected to the damper 33, so that the furnace draft is controlled in accordance with the steam pressure, the draft being increased for a decrease in the steam pressure. As is well-known in the furnace art, a decrease or an increase of the steam pressure indicates an increase or a decrease in the demand for steam or the load upon the boiler, and the combustion must therefore be respectively increased or decreased for the boiler to carry the load. While the master regulator is shown as being operated by steam pressure, it may be operated by steam flow or by a combination of steam pressure and steam flow, as will be readily understood by anyone skilled in the furnace control art.

The chain 40 is connected to the valve 26 which controls the fuel supply, so that a decrease in steam pressure will be accompanied by an increased supply of fuel.

The pressure in the combustion chamber 21 is regulated and is preferably kept constant by means of the regulator 41 which is connected to the combustion chamber by the pipe 42. Such a control of the combustion chamber pressure is described in the Peebles Patent No. 1,492,604, and therefore need not be described in detail. As described in the Peebles patent, the pressure in the combustion chamber is applied to a regulating device having a bell 43 indicated in dotted lines. A power cylinder having a piston provided with a downwardly extending rod 44 is actuated in accordance with the pressure of the gases in the combustion chamber and regulates the position of the damper 29. If the pressure in the combustion chamber 21 falls below the pressure for which the device is set, the damper 29 is opened to the desired amount to supply more air from the forced draft and restore the desired pressure. If the pressure in the combustion chamber rises, the damper 29 is adjusted toward its closed position to cut down the air and reduce the pressure to the desired point. The regulator 41 has an incremental or compensated movement, so that the damper 29 may assume any desired position.

The primary control of combustion, as described above, is modified by a secondary control in accordance with the carbon dioxide content of the flue gases. The secondary control device is indicated generally by reference numeral 45 in Figure 1, and is shown in more detail in Figure 2. A bight of the stack damper controlling chain 39 is passed over pulleys and around a pulley 46 carried by the upper end of the piston rod 47 of a power actuated cylinder 48. As hereinafter described, the piston rod 47 is moved up or down in accordance with a decrease or increase, respectively, in the carbon dioxide content of the flue gas, so as to move the stack damper 33 toward its closed or toward its open position respectively. A decrease in the carbon dioxide content below the predetermined amount for which the device is set indicates that too much air is being drawn through the furnace, and the damper 33 should therefore be adjusted toward its closed position to cut down the proportion of air relative to that of the fuel. It will be noted that the control of the air and the fuel is primarily regulated by the master regulator, and that the air is secondarily controlled by the carbon dioxide analyzing device so as to adjust the proportions of air and fuel. While the carbon dioxide analyzing device is shown as modifying the air control so as to regulate the relative proportions of air and fuel, it might equally well be applied to modify the fuel controlling device, which also would result in the control of the proportion of air and fuel.

It will also be noted that while the carbon dioxide analyzing device operates as a secondary control through the primary controlling system, the carbon dioxide analyzing device and the primary controlling system may operate independently of each other. For example, if the steam pressure remains constant but the proportion of carbon dioxide in the flue gas varies, the gas analysis device will operate to vary the air but without affecting the fuel feed. On the other hand, if the carbon dioxide content remains constant but the steam pressure varies, the primary control will serve alone to regulate the fuel and air necessary for the change in load upon the boiler. Therefore, while it is preferred to have the flue gas analyzing apparatus operate through the draft controlling dampers and the control means therefor which forms a part of the primary regulation, the control in accordance with the flue gas analysis might be otherwise and independently applied to the furnace.

Flue or combustion gas is tapped off from the boiler breeching through a tube 49 to the blower 10. From the blower 10 it passes through the device 13 which filters the gas, humidifies it and brings it to a predetermined temperature. This device is shown in detail in Figure 7 of the drawings. It consists of a closed chamber 50 containing a water bath 51. The gas is discharged through a submerged nozzle 52 against an impingement plate 53 which is likewise submerged and bathed in the water bath 51. The impingement upon the plate 53 of the stream of gas serves efficiently to remove practically all of the suspended dust and smoke particles. Since the gas is exposed to the water in finely divided bubbles, it is humidified, being saturated with water vapor at the temperature of the water bath. The gas is also brought to the temperature of the water bath, which may be maintained substantially constant, by circulating water through the device. The device 13 is described and illustrated in its structural details on pages 66 and 67 of Public Health Bulletin No. 144, of January, 1925, entitled "Comparative Tests of Instruments for Determining Atmospheric Dusts", published by the United States Government Printing Office at Washington, D. C. for the United States Public Health Service under the Treasury Department. The flue gas, after being thus filtered, humidified and brought to a predetermined temperature, passes to the supply pipe 3 and through the capillary tube 1 and orifice 2 to the atmosphere. As before described, the intermediate pressure in the chamber 4 will vary with the percentage of carbon dioxide in the flue gas, and such variations may be used for automatically controlling the combustion to maintain the carbon dioxide content at the desired percentage.

Figure 7:
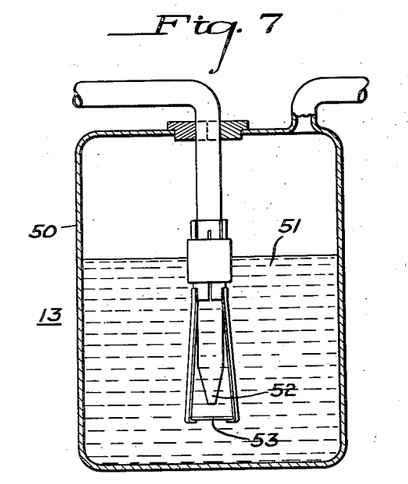
Figure 7 is a detail view of the preferred device for filtering, humidifying and temperature controlling the gases.

The intermediate pressure in the chamber 4 is balanced against the intermediate pressure in the chamber 9 between the capillary tube 6 and orifice 7 which is supplied with air. The air is supplied by a blower 11 driven from the same motor as the shaft 12, so that any change in the motor speed will equally affect the blowers 10 and 11 operating on the flue gas and air respectively. The air passes through a device 14, which is a duplicate of the device 13 and is illustrated in Figure 7, and in which the air is washed, humidified and brought to the desired temperature. By maintaining the water baths in the devices 13 and 14 at the same temperature, the flue gas and air may be maintained at the same temperature as supplied to the gas analyzing restriction. As above described, a constant pressure device 17 serves to maintain a predetermined and constant pressure on both the air and the gas supplied to the inlet tubes 8 and 3.

Pipe connections 54 and 55 lead from the chambers 4 and 9, respectively, to two inverted bells 56 and 57. The pressure gauge 5 is tapped off from these pipe connections 54 and 55 and gives a visual indication of the differential pressure between the chambers 4 and 9. The bells 56 and 57 will be subjected to this differential pressure. The bells 56 and 57 are partially immersed in a water bath 58 in the chamber 59. The bells are carried upon opposite ends of a balance beam or lever 60 pivoted at 61. The two sets of flow restrictions may be calibrated for air flowing through them both, so that the pressures in the intermediate chambers 4 and 9 will both be equal for air. For purposes of calibration, the blower 10 may be supplied with air through a branch supply pipe 62 controlled by a valve 63. If the flue gas is shut off by a valve 64 and the valve 63 is opened, air may be supplied to the blower 10, and by closing the valve 63 and opening the valve 64, flue gas may be supplied, as desired.

If the flow restrictions 1 and 2 and 6 and 7 are proportioned to give the same pressures in the chambers 4 and 9 for air flowing through both sets of flow restrictions, then when flue gas is passed through the flow restrictions 1 and 2, the pressure in the chamber 4 will be greater than that in the chamber 9 in proportion to the amount of carbon dioxide in the flue gas. A greater pressure will therefore be applied to the interior of the bell 56 than to that of the bell 57, and the beam 60 will tend to be tilted in a clockwise direction as viewed in Figures 1 and 2. An adjustable weight 65 is carried by the balance beam 60 and may be adjusted to hold the beam 60 in a horizontal or equilibrium position for a particular increased pressure in the bell 56 corresponding to the desired carbon dioxide content of the flue gas. If the carbon dioxide content increases above that to which the weight 65 is set, the liquid will be displaced downwardly in the bell 56 and the bell will tend to rise, or vice versa if the carbon dioxide content of the flue gas decreases. The movement of the balance beam 60, which is controlled by the carbon dioxide content of the flue gas, is transmitted through a rod 66 to actuate a pilot valve 67 which controls the power cylinder 48. As the piston of the cylinder rises and falls, it operates through an inclined bar 68 which reacts on the control of the pilot valve 67, so that the piston of the power cylinder has a step-by-step movement or is compensated and may assume intermediate positions, depending upon the variations in pressure applied to the bell 56. The power cylinder 48, its pilot valve 67 and its inclined compensating bar 68 are of the type disclosed in the Peebles Patents 1,339,000 and 1,492,604 and the Hopwood Patents 1,338,924 and 1,371,243, to which reference may be made for the details of construction.

The operation of my flue gas analyzing apparatus in controlling combustion may be briefly summarized as follows:

If the carbon dioxide content of the flue gas increases to above the percentage for which the device is set, the intermediate pressure in the chamber 4 increases and the pressure in the bell 56 likewise increases. This tends to displace the fluid from the bell 56 and raises the bell, tilting the balance lever 60 in a clockwise direction as viewed in Figures 1 and 2. The balance lever 60 operates through the rod 66 and pilot valve 67 to actuate the power cylinder 48. The piston rod will then move downward a predetermined amount before its downward movement is checked or compensated for by the inclined bar 68. The downward movement of the piston rod 47 will draw out the bight of the chain 39 by means of the pulley 46, and will adjust the stack damper 33 to a wider open position. This will reduce the pressure in the combustion chamber 21, which in turn will react through the regulator 41 to increase the opening of the damper 29 in the air duct 27 and will supply more air through the furnace. This will reduce and restore the carbon dioxide content of the flue gas to the desired percentage. On the other hand, if the carbon dioxide content of the gas falls below the desired percentage, the intermediate pressure in the chamber 4 will fall, the pressure at the bell 56 will be decreased, and the lever 60 will be moved in a counter clockwise direction as viewed in Figures 1 and 2. The lever 60 will operate through the pilot valve 67 to control the power cylinder 48 which will raise the piston rod 47 and through the chain 39 adjust the stack damper 33 to reduce the stack draft and consequently reduce the air for combustion drawn through the furnace. This will restore the proper proportions of air and fuel to give the desired carbon dioxide percentage in the flue gas.

While it is preferred to utilize two sets of capillary and orifice restrictions as shown in Figure 2 so as to eliminate or minimize temperature effects and obtain a differential pressure, a more simple form of device, such as shown in Figure 3, may be used. In the apparatus shown in Figure 3, the flue gas is drawn in through a pipe 49 from the boiler breeching through a blower 10$^a$ and through a device 13$^a$ identical with that of the device 13 as shown in Figure 7. The gas is then delivered to the inlet pipe 3 in which it is maintained at a constant pressure by means of the constant pressure device 17$^a$ which, like the constant pressure device 17, consists of a tube 18$^a$ which discharges excess gas beneath the surface of a liquid bath 19$^a$.

The chamber 4 is connected by the pipe 54$^a$ to a pressure gauge 5$^a$ and a bell 56$^a$. The bell 56$^a$ is carried on a balance beam 60$^a$. The other end of the balance beam is provided with a bell 57$^a$, the interior of which is open to the atmosphere through a throttle opening controlled by a valve 69. As explained above, the pressure in the chamber 4 will always be super-atmospheric. This pressure as applied to the bell 56$^a$ is balanced by a weight 65$^a$. The weight 65$^a$ is adjusted so that the beam 60$^a$ will assume a horizontal or balanced position for a pressure in the chamber 4 and bell 56$^a$ corresponding to the desired carbon dioxide percentage of the flue gas. If the carbon dioxide percentage increases, the pressure in the chamber 4 and bell 56$^a$ increases, and the lever 60$^a$ will be tilted in a clockwise direction, as viewed in Figure 3, and will operate through the rod 66 and pilot valve 67 to actuate the power cylinder 48 and draw down the piston rod 47 and its pulley 46 and through the chain 39 open the stack damper 33 and increase the ratio of air to fuel and restore the carbon dioxide content to the desired amount. If the carbon dioxide content decreases, the reverse operations will take place.

Figure 6:
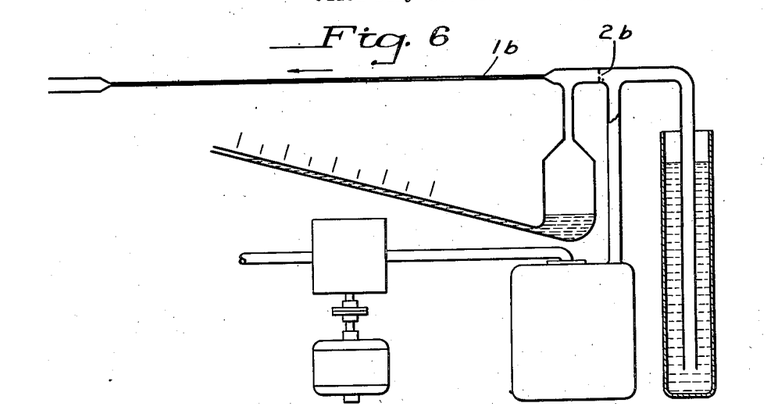

While it is preferred to first pass the fluid to be analyzed through a capillary or lamellar restriction and then through an orifice or turbulent flow restriction, as shown in Figures 2 and 3, the restrictions may be reversed and the gas may be first passed through an orifice or turbulent flow restriction 2$^b$ and then through a capillary or lamellar flow restriction 1$^b$, as illustrated in Figure 6. Therefore, when in my claims I speak of passing the fluid through lamellar and turbulent flow restrictions in series, or through turbulent and lamellar flow restrictions in series, I do not intend to limit the passage of the fluid through such restrictions in any particular order, unless so explicitly specified.

While it is preferred, in a device such as shown in Figure 2 in which a differential pressure is secured by balancing the intermediate pressure of the gas to be analyzed against the intermediate pressure of air, to employ sets of restrictions, one for the gas and the other for the air, each consisting of a lamellar flow and a turbulent flow restriction, the pressure of the air or gas of known composition, which is balanced against that of the gas to be analyzed, may be otherwise provided. For example, in Figure 4 the gas to be analyzed is passed through a capillary tube $1^c$ and an orifice $2^c$, and the intermediate pressure in the chamber $4^c$ is balanced against an intermediate pressure in the chamber $9^c$ into which the air is admitted through an orifice $6^c$ and from which it is discharged through another orifice $7^c$.

Figure 5:
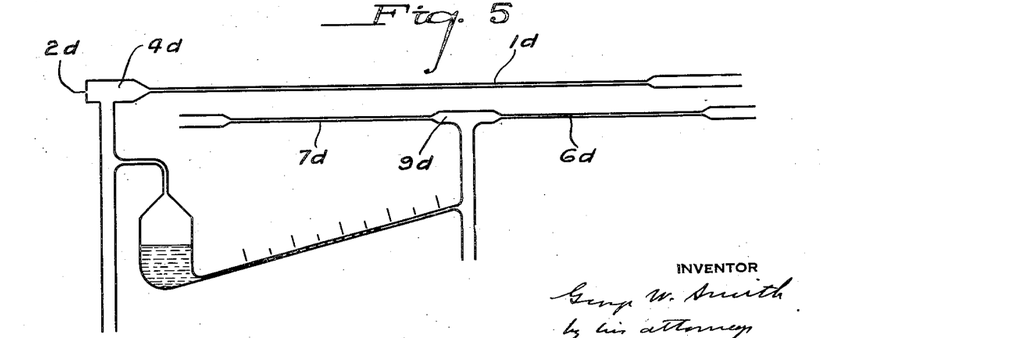

In Fig. 5 there is illustrated another modification in which the air pressure in the chamber $9^d$ and which is balanced against the chamber $4^d$, is secured by passing the air through two capillary tubes $6^d$ and $7^d$.

Figure 8:
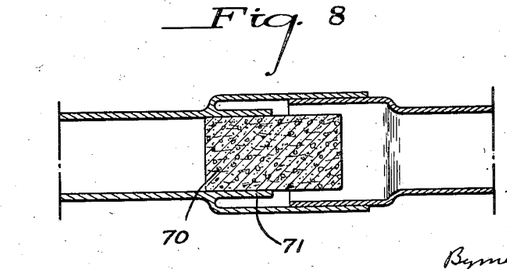
Figure 8 is a detail view showing a porous plug form of capillary flow restriction.

For purposes of simplicity and diagrammatic illustration, the lamellar flow restrictions are illustrated in Figures 2 to 6, inclusive, as being capillary tubes. In actual practice such tubes present certain objections, such as difficulty of calibration adjustments and liability of stoppage by a single particle of solid matter. In actual practice I prefer to use for the lamellar or capillary flow restriction, a plug of porous material. Such a device is illustrated in Figure 8. It consists of a plug 70 of porous material. This may be any suitable material, but I have found a satisfactory material to be porous earthenware. I have used for this purpose a plug made of a filter block material. These filter blocks are made and sold under various trade names, the material known as "Filtros" being a well-known material. "Filtros" consists of crushed silica grains bonded so as to be porous. It may be obtained in various degrees of porosity. A plug of this character presents a large number of fine openings, so that if one opening becomes clogged with a particle of dust, the flow is not appreciably lessened.

The flow through a porous plug is of the lamellar type provided the pores are fine and the pressure is not too great. If a porous plug with relatively coarse openings, such, for example, as the coarser grades of "Filtros" is employed, the flow through the plug may be partly lamellar and partly turbulent. If a plug of this character is used, the pressure drop is dependent upon both the density and the viscosity of the gas. Such plug may be used in my apparatus, but the lamellar flow only is usefully effective. The turbulent flow effect simply reduces the effectiveness of the component of the pressure drop across the porous plug which is due to the lamellar flow. Therefore I do not intend that the expression "lamellar flow restriction" as used herein shall be limited to a flow restriction having purely lamellar flow characteristics, but include a flow restriction which has lamellar flow characteristics although it may have in addition turbulent flow characteristics. Also a restriction which operates primarily upon turbulent flow may have some lamellar flow characteristics and therefore the expression "turbulent flow restriction" is intended to include such a restriction. The terms "lamellar" and "turbulent" flow restrictions, as used herein, are intended as relative terms and to define two restrictions, the flow in the first being more nearly lamellar than in the second and the flow in the second being more nearly turbulent than in the first. While it is preferred to have the flow through the lamellar and turbulent flow restrictions substantially all lamellar and turbulent, respectively, the desired effect may be produced by the relative lamellar and turbulent flow characteristics of two restrictions in which the flow may not be purely lamellar and turbulent.

The porous plug may be arranged as shown in Figure 8 so that its resistance to flow may be adjusted. As shown in Figure 8, the plug is held in a sleeve 71 in which it may be adjusted so that more or less of the plug is included within the sleeve. If the plug is adjusted to the right, as shown in Figure 8, its resistance to flow may be decreased.

Figure 9:
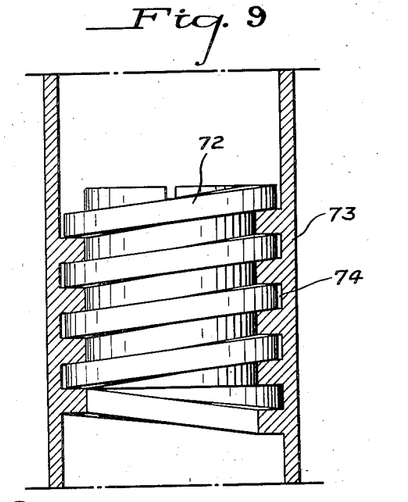
Figure 9 is a detail view showing an adjustable form of capillary flow restriction.

Another form of capillary flow restriction which may be adjusted is shown in Figure 9. This consists of a screw block 72 which is held in a threaded sleeve 73, there being a clearance left at the bottom of the threads as indicated at 74. By turning the screw plug 72 in and out of the sleeve, the length of the capillary opening 74 at the bottom of the threads may be varied and consequently its resistance to flow.

The claims in this application are directed to the method of analyzing a fluid mixture and to apparatus for fluid analysis. The claims directed to the method of and apparatus for regulating combustion of fuel in a furnace in accordance with the invention herein described, are presented in a divisional application filed by me on April 8, 1929, Serial No. 353,515.

While I have specifically illustrated and described the preferred embodiment of my invention, and with particular reference to its application for the automatic control of combustion, it is to be understood that the invention is not so limited, but may be otherwise embodied within the scope of the following claims.

I claim:

1. The method of analyzing a fluid mixture, which comprises passing the mixture through lamellar and turbulent flow restrictions in series at constant initial and final pressures, and measuring the pressure at a point intermediate the restrictions.

2. The method of analyzing a fluid mixture, which comprises passing the mixture through lamellar and turbulent flow restrictions in series, one of said restrictions having a much larger pressure drop than the other restriction so that the flow of the mixture is primarily dependent upon the resistance of such restriction, and measuring the pressure drop across the other restriction.

3. The method of analyzing a fluid mixture, which comprises passing the fluid mixture through lamellar and turbulent flow restrictions in series, the lamellar flow restriction having a much larger pressure drop than the turbulent flow restriction, so that the flow of the mixture is primarily dependent upon the resistance of the lamellar flow restriction, and measuring the pressure drop across the turbulent flow restriction.

4. The method of analyzing a fluid mixture, which comprises passing the mixture through turbulent and lamellar flow restrictions in series at constant initial and final pressures, and measuring the pressure drop across one of the restrictions.

5. The method of analyzing a combustion gas for carbon dioxide, which comprises passing the gas through turbulent and lamellar flow restrictions in series, and measuring the variations in pressure at an intermediate point caused by variations in the proportion of carbon dioxide in the gas.

6. The method of analyzing a combustion gas for carbon dioxide, which comprises passing the gas through turbulent and lamellar flow restrictions in series, and measuring the pressure drop across one of the restrictions.

7. The method of analyzing a fluid mixture, which comprises passing the mixture through lamellar and turbulent flow restrictions in series, passing a fluid of fixed composition through two flow restrictions in series, and measuring the variations in the differential pressure between points intermediate the flow restrictions caused by variations in the composition of the mixture.

8. The method of analyzing a fluid mixture, which comprises passing the mixture through turbulent and lamellar flow restrictions in series, passing a fluid of fixed composition through similar turbulent and lamellar flow restrictions in series at the same initial and final pressures as those of the fluid flowing through the first set of flow restrictions, and measuring the differential pressure between similar points intermediate the flow restrictions of each set of flow restrictions.

9. The method of analyzing a gaseous mixture, which comprises passing the mixture through lamellar and turbulent flow restrictions in series, passing a gas of fixed composition through a similar set of lamellar and turbulent flow restrictions in series at approximately the same temperature and humidity and at the same initial and final pressures as those of the gas to be analyzed, and comparing the pressures at the points intermediate the flow restrictions of each set.

10. The method of analyzing a gaseous mixture, which comprises passing the mixture through turbulent and lamellar flow restrictions in series, one of said restrictions having a much larger pressure drop than the other restriction so that the flow of the mixture is primarily dependent upon the resistance of such restriction, passing a gas of fixed composition through a similar set of lamellar and turbulent flow restrictions in series at the same initial and final pressures as those of the gas flowing through the first set of flow restrictions, and measuring the differential pressure between points intermediate the flow restrictions of each set of flow restrictions.

11. Apparatus for fluid analysis, comprising a set of turbulent and lamellar flow restrictions connected in series, means for supplying the fluid to be analyzed at a constant initial pressure, temperature regulating means tending to maintain uniform the temperature of the fluid supplied for analysis, the fluid being discharged from the set at a constant final pressure, and means for measuring the pressure at a point intermediate the restrictions.

12. Apparatus for fluid analysis, comprising a set of lamellar and turbulent flow restrictions connected in series, one of said restrictions having a relatively much larger resistance to flow than that of the other restriction so that the flow of the mixture is primarily dependent upon the resistance of such restriction, and means for measuring the pressure drop across the other restriction.

13. Apparatus for fluid analysis, comprising two sets of flow restrictions, one set comprising turbulent and lamellar flow restrictions connected in series, and the other set comprising two flow restrictions connected in series, means for supplying the gas to be analyzed to the first set and a gas of fixed composition to the second set at the same initial and final pressures, and means for measuring the differential pressure between points intermediate the flow restrictions of each set.

14. Apparatus for fluid analysis comprising two devices, one of which is responsive to variations in the density of a fluid but substantially independent of its viscosity, and the other of which is responsive to variations in its viscosity but is substantially independent of its density, means for passing a fluid through the two devices, and means for measuring the differential effect produced in the two devices by variations in the density and/or viscosity of the fluid.

15. The method of analyzing a fluid mixture which comprises regulating the temperature of the fluid mixture supplied for analysis to maintain the temperature uniform, passing the mixture through lamellar and turbulent flow restrictions in series at constant initial and final pressures, and measuring the pressures at a point intermediate the restrictions.

16. The method of analyzing a fluid mixture which comprises supplying the fluid mixture to be analyzed at uniform temperature, passing the mixture through turbulent and lamellar flow restrictions in series at constant initial and final pressures, and measuring the pressure drop across one of the restrictions.

17. The method of analyzing a combustion gas for carbon dioxide which comprises regulating the temperature of the combustion gas supplied for analysis to maintain the temperature uniform, passing the combustion gas through turbulent and lamellar flow restrictions in series, and measuring the variations in pressure at an intermediate point caused by variations in the proportion of carbon dioxide in the gas.

18. The method of analyzing a combustion gas for carbon dioxide gas which comprises regulating the temperature of the combustion gas supplied for analysis to maintain the temperature uniform, passing the combustion gas through turbulent and lamellar flow restrictions in series, and measuring the pressure drop across one of the restrictions.

19. The method of analyzing a fluid mixture which comprises regulating the temperature and humidity of the fluid mixture supplied for analysis to maintain the temperature and humidity uniform, passing the mixture through turbulent and lamellar flow restrictions in series at constant initial and final pressures, and measuring the pressures at a point intermediate the restrictions.

20. The method of analyzing a fluid mixture which comprises regulating the temperature and humidity of the fluid mixture supplied for analysis to maintain the temperature and humidity uniform, passing the mixture through turbulent and lamellar flow restrictions in series at constant initial and final pressures, and measuring the pressure drop across one of the restrictions.

In testimony whereof I have hereunto set my hand.

GEORGE W. SMITH.